(12) United States Patent
Kotani

(10) Patent No.: US 6,195,178 B1
(45) Date of Patent: *Feb. 27, 2001

(54) INFORMATION PROCESSING SYSTEM

(75) Inventor: Masaki Kotani, Johyou (JP)

(73) Assignee: Murata Kikai Kabushiki Kaisha, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/889,105

(22) Filed: Jul. 7, 1997

(30) Foreign Application Priority Data

Jul. 9, 1996 (JP) .................................................. 8-179467

(51) Int. Cl.$^7$ ...................................................... H04N 1/32
(52) U.S. Cl. .......................... 358/442; 358/404; 358/468; 711/147
(58) Field of Search ..................................... 358/442, 408, 358/444, 468, 404, 1.15, 1.16, 1.17; 711/147, 153, 155

(56) References Cited

U.S. PATENT DOCUMENTS

| 4,941,170 | * | 7/1990 | Herbst | 379/100.07 |
|---|---|---|---|---|
| 4,947,266 | * | 8/1990 | Watanabe et al. | 358/408 |
| 5,179,665 | | 1/1993 | Roslund | 395/250 |
| 5,317,693 | | 5/1994 | Cuenod et al. | 395/275 |
| 5,331,424 | * | 7/1994 | Matsui et al. | 358/404 |
| 5,452,106 | | 9/1995 | Perkins | 358/468 |
| 5,459,851 | | 10/1995 | Nakajima et al. | 395/476 |
| 5,537,639 | | 7/1996 | Matsumoto et al. | 395/200.13 |
| 5,570,201 | * | 10/1996 | Yokota | 358/404 |

FOREIGN PATENT DOCUMENTS

| 42 07 158 A1 | 10/1992 | (DE) . |
| 0 321 240 A2 | 6/1989 | (EP) . |
| 0 375 194 A2 | 6/1990 | (EP) . |
| 0 483 735 A2 | 5/1992 | (EP) . |
| 07065145 | 3/1995 | (JP) . |

OTHER PUBLICATIONS

Copy of European Patent Office Communication for European Patent Application 97111564.7 including European Search Report dated Oct. 6, 1999.

Copy of European Patent Office Communication for European Patent Application 97111564.7 including European Search Report dated Aug. 10, 1999.

* cited by examiner

Primary Examiner—Leo H. Boudreau
Assistant Examiner—Gregory Desiré
(74) Attorney, Agent, or Firm—Armstrong, Westerman, Hattori, McLeland & Naughton

(57) ABSTRACT

An information processing device of the present invention can be connected to a plurality of external devices by daisy chain format. The external device is provided with DPRAM (Dual Port RAM) and is capable of being connected not only with the information processing device, but also with another external device. DPPRM has an up-load area and an down-load area. DPRAM is able to transfer data in both directions as it is connected with the information processing device and other external devices by duplex bus. One device obtains permission to use DPRAM, writes in a specific address and generates an interrupt signal to the other device. The other device that detected the interrupt signal processes the data referring to DPRAM and transfers the data by releasing the permission to use DPRAM.

2 Claims, 12 Drawing Sheets

FIG. 3(a)

MANAGEMENT TABLE T OF FIRST RAM

| | DOWN-LOAD AREA | 0 |
|---|---|---|
| DATA TYPE | REMOTE FUNCTION | 1 |
| | REMOTE FUNCTION RETURN VALUE | 1 |
| | DATA TRANSFER | 0 |
| | DATA TRANSFER RESULT | 1 |
| | AT COMMAND | 1 |
| | AT COMMAND RESULT CODE | 1 |

FIG. 3(b)

FIRST MANAGEMENT TABLE T1 OF SECOND RAM

| | UP-LOAD AREA | 0 |
|---|---|---|
| DATA TYPE | REMOTE FUNCTION | 1 |
| | REMOTE FUNCTION RETURN VALUE | 1 |
| | DATA TRANSFER | 1 |
| | DATA TRANSFER RESULT | 0 |
| | AT COMMAND | 1 |
| | AT COMMAND RESULT CODE | 1 |

SECOND MANAGEMENT TABLE T2 OF SECOND RAM

| | DOWN-LOAD AREA | 1 |
|---|---|---|
| DATA TYPE | REMOTE FUNCTION | 1 |
| | REMOTE FUNCTION RETURN VALUE | 1 |
| | DATA TRANSFER | 1 |
| | DATA TRANSFER RESULT | 1 |
| | AT COMMAND | 1 |
| | AT COMMAND RESULT CODE | 1 |

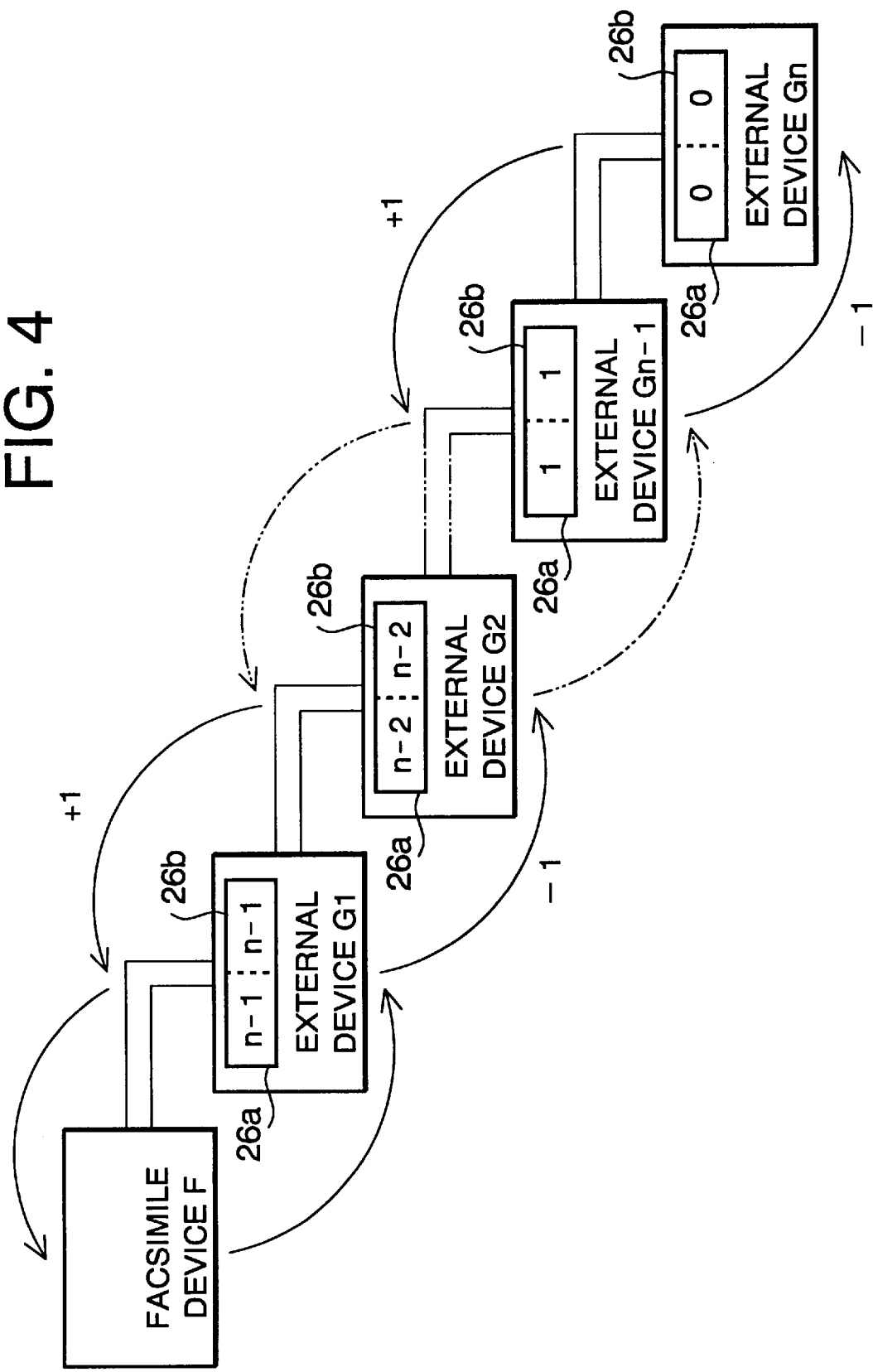

INFORMATION PROCESSING SYSTEM

BACKGROUND OF THE INVENTION

1. Field of the Invention

The present invention relates to an information processing device such as a facsimile device or personal computer or the like and to an external device such as a scanner or printer or the like which is capable of connecting with the information processing device.

2. Description of the Related Art

With the recent development of an information society, the ways information processing devices are used have increased greatly. However, realizing a single information processing device that is able to cope with all such demands would be expensive. Accordingly, various external devices are connected as necessary to a device that is provided with basic functions.

Thus, if a facsimile is used as an example of an information processing device, a modem for use with multiple lines, a scanner or a printer or the like are all examples of external devices. Methods for connection of these external devices to the information processing device are, for example, providing a connector for connecting the external devices to the information processing device, or connecting the external devices by a daisy chain method using a special interface board of such as SCSI (Small Computer System Interface) format.

However, when connectors are used, if a plurality of external devices are to be connected to the information processing device, it is necessary to arrange a plurality of connectors on that information processing device. Moreover, the construction for handling the interface with the external devices becomes complicated in response to the increase in number of connectors. In this way, a structure for controlling a plurality of external devices must be pre-provided in the information processing device even if no external devices are connected to the information processing device, causing increased production costs. Furthermore, if the number of external devices connected to the connector increases, the load on the CPU (Central Processing Unit) of the information processing device that control all these connectors increases.

Yet further, using a method utilizing a special interface board such as an SCSI format or the like, it is necessary to arrange this interface board on the information processing device and external device and to perform communication between the information processing device and external device in accordance with a specific communication protocol. Moreover, it is necessary to change the specifications of the interface board arranged in the information processing device according to the number of external devices connected to the information processing device and what kind of device they are. As a result, such arrangement of the information processing device and external device as above not only become costly but there are limitations on communication procedures as it is necessary to perform communication in accordance with specific communication protocols, decreasing the utility of the device.

SUMMARY OF THE INVENTION

In order to solve the problems stated above, the present invention aims to propose an information processing system including external devices having a simple structure, reduced production costs and wide utility.

The facsimile device of the present invention has the following advantages and effects due to its unique structure.

(1) By arranging a single connector, a plurality of external devices may be connected to the facsimile device in a daisy chain format. Due to this, when the number of external devices is increased, all needed to be done is just connecting the new external device to the terminal (last) external device. Accordingly, the structure of the facsimile device is simplified. Furthermore, the data transfer from the facsimile device to the external device and the data transfer from the external device to the facsimile device is carried out via a DPRAM arranged in each external device thus the data transfer between those external devices and the facsimile device may be simply and efficiently performed regardless of the number of connection of external devices.

In addition, when the information processing device is a facsimile device, a simple one-line facsimile can be easily changed to a two-line specification or a local area network (LAN) corresponding specification.

(2) When a plurality of sub-systems are connected in a daisy chain format via a plurality of memory means and data is transferred in the up-load direction, the stack number is added and when data transfer is in the down-load direction, the stack number is subtracted. The highest level sub-system is able to specify the system being the transmission source of the data by referring to the stack number. Furthermore, as each sub-system is able to determine that itself is the address to which the data is to be sent when the stack number is a predetermined value (for example, "0"), the programs of the sub-systems are common.

That is, the same software relating to the DPRAM, two connectors, and data transfer can be shared among the external devices. In short, no matter what number of connection is the external device from the facsimile, determination of whether data is addressed to itself or not can be performed based on whether the stack number is "0" or not. Due to this, the elements that can be made common as external devices are many and the cost of the external device can be reduced.

(3) The memory means which is able to be read from and written into in both directions is provided with independent up-load area and down-load area and furthermore, as they are connected by a full duplex bus, communication in both directions may be efficiently performed and the through-put relating to communication is improved. Furthermore, two sub-systems are connected via a memory means and exclusive control of the memory means common between the sub-systems is adequately performed by one of the sub-systems having permission to use the memory means and the other sub-system discarding the permission to use the memory means That is, as the DPRAM is divided into an up-load area being a memory area for the data to be transferred to the up-load side, and a down-load area being a memory area for the data to be transferred to the down-load side, and moreover, as full duplex communication is possible, the data can always be efficiently and simultaneously transferred in both directions and furthermore, the data can be transferred at high speed as there is parallel transfer.

Yet further, as a semaphore for managing the exclusive control of the memory area and a semaphore for managing each type of data in the memory area are independently arranged in the exclusive control of the memory means in the sub-systems, if the type of data differs, the memory area may be effectively used through multi-processing by multi-tasking.

(4) When the facsimile device transfers data to an external device, it simply transfers data including a stack number which the external device has notified to the facsimile to the first external device (G1) without determining which number external device that data should be transferred to. As a result, even if the number of external devices increase, the load on the first CPU at the facsimile device does not change. Furthermore, there is no need to change the specifications of the facsimile device regardless of the type and number of external devices thus increasing the utility of the facsimile device.

(5) As the facsimile device recognizes each external device by the stack number notified from each external device, each external device, even if they are of the same type, may be recognized.

BRIEF DESCRIPTION OF THE DRAWINGS

FIG. 3 is an explanatory diagram for describing the control table of the first and second RAM.

FIG. 4 is an explanatory diagram for describing the stack number.

DESCRIPTION OF THE PREFERRED EMBODIMENTS

First, the interruption processing and the exclusive control of the DPRAM in the system in the information processing system of the present invention will be described with reference to FIG. 11.

System 1 and system 2 are systems that operate without mutual synchronization. DPRAM 3 is a memory means having two input/output ports and is a memory means capable of reading or writing from either of the ports with respect to the same address. Accordingly, system 1 and system 2 which are connected to each input/output port of the DPRAM 3 are able to independently read from and write to the DPRAM 3 and data can be transferred without synchronization.

A request from system 1 is conveyed to system 2 as an interrupt request. This interrupt request is performed by the system 1s' writing of data to the DPRAM 3. In short, DPRAM 3 is pre-prepared with a specific address as an interrupt generation address rA. An interrupt signal is output to system 2 from the DPRAM 3 when system 1 writes in the DPRAM 3 specifying this interrupt generation address rA. Thus, a request from system 1 is transmitted to system 2.

System 2 which has received the interrupt signal removes the interrupt. Removal of the interrupt is stopping the output of the interrupt signal. System 2 is able to stop the output of the interrupt signal from the DPRAM 3 by reading data from the DPRAM 3 by specifying an interrupt stop address rB.

Further, system 2 which has removed the interrupt writes data into the DPRAM 3 showing that it has received the data. This data writing is an operation of at first specifying a status address rC and then writing "1" at a predetermined bit such as the LSB (Least Significant Bit) of the data of that address.

If system 1 which carried out the interrupt request thereafter monitors that LSB by periodically reading the status address rC, it is able to recognize whether or not system 2 has received that interrupt request. However, in order to carry out this kind of determination, there must be a preposition that when an interrupt request is to be performed system 1 has written "0" in the LSB of the status address rC.

Figure 11:
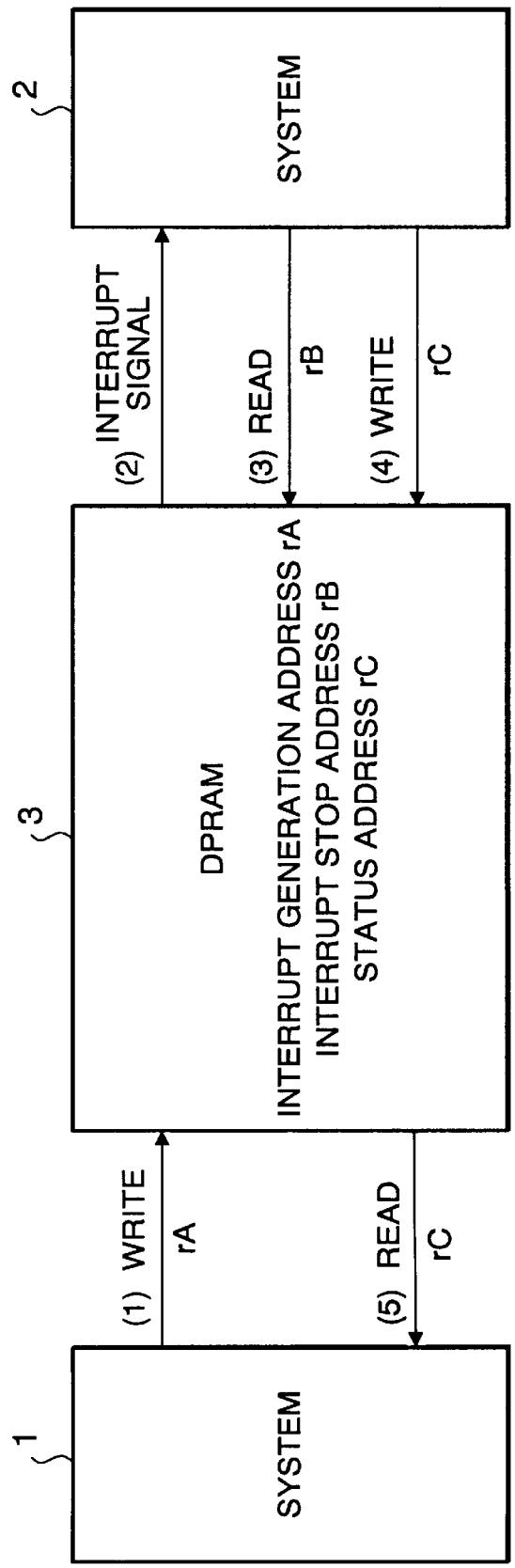
FIG. 11 is an explanatory diagram of the interrupt and the exclusive control between the systems.
Figure 12:
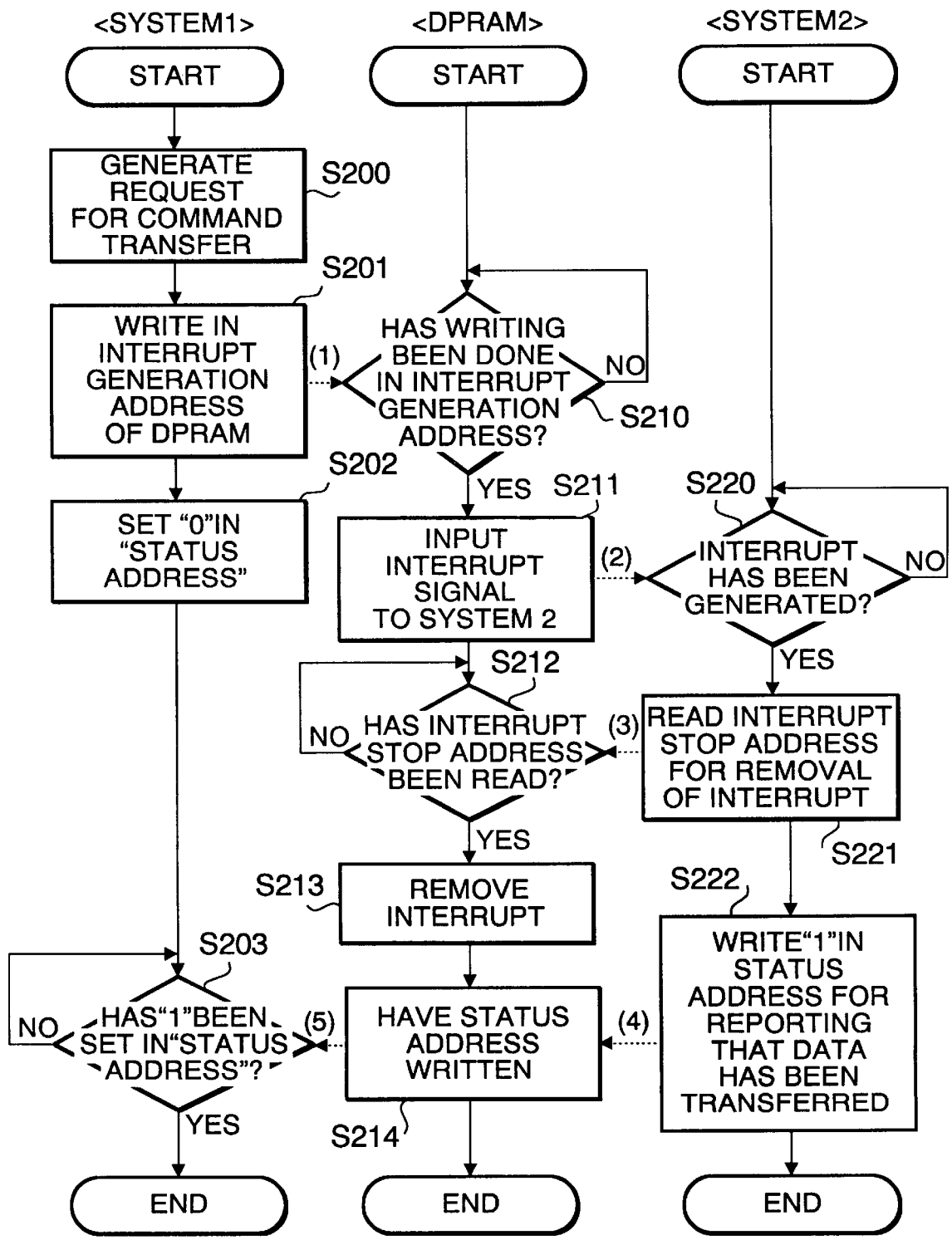
FIG. 12 is a flow chart showing the interrupt and the exclusive control between the systems.

FIG. 12 is a flow chart showing one example of the basic operations of the multi-system type information processing device shown in FIG. 11. This drawing shows the interrelationship over time of each operation of system 1, the DPRAM 3 and system 2. S200–S203 show the flow chart for system 1, S210–S214 show the flow chart for DPRAM 3 and S220–S222 show the flow chart for system 2. (1) to (5) of FIG. 11 correspond to (1) to (5) of FIG. 12 respectively.

In system 1, when a request for command transfer to system 2 is generated (S200), system 1 writes in the interrupt generation address rA of DPRAM 3 (S201) and sets a 0 in the status address rC (S202). DPRAM 30 monitors the writing in the interrupt generation address rA by system 1 (S210) and if there is writing, starts the output of an interrupt signal to system 2 (S211). System 2 monitors the interrupt signal and if an interrupt signal is detected, interrupt processing starts (S220).

In the interrupt processing of system 2, first, in order to remove the interrupt, reading of the interrupt stop address rB of DPRAM 3 is carried out (S221). DPRAM 3 monitors the reading of the interrupt stop address rB by system 2 (S212) and if there is a reading, the output of an interrupt signal to system 2 is stopped by removing the interrupt (S213).

Lastly, system 2 writes a "1" in the LSB of the status address rC (S222). On the other hand, system 1, after its command writing in the DPRAM 3 (S201), it periodically reads the status address rC of DPRAM 30 (S203) and is able to confirm that the request of system 1 has been transferred to system 2 by confirming that the LSB has changed to a "1".

It is necessary to prohibit the use of the DPRAM 3 by another processing during the period from setting a "0" in the status address rC of DPRAM 3 by system 1 when an interrupt is generated, until system 2's stopping the interrupt and returning the status address rC to "1" after referring to the data. In short, the exclusive control of the DPRAM 3 is possible by the determination of the availability of DPRAM 3 depending on the value of the status address rC.

Next, exclusive control of the DPRAM 3 between the two systems is performed depending on the value of the status address rC of the DPRAM 3 and a more detailed embodiment of the present invention realized in an information processing system including a facsimile device and an external device connected to the facsimile device will be described.

Figure 1:
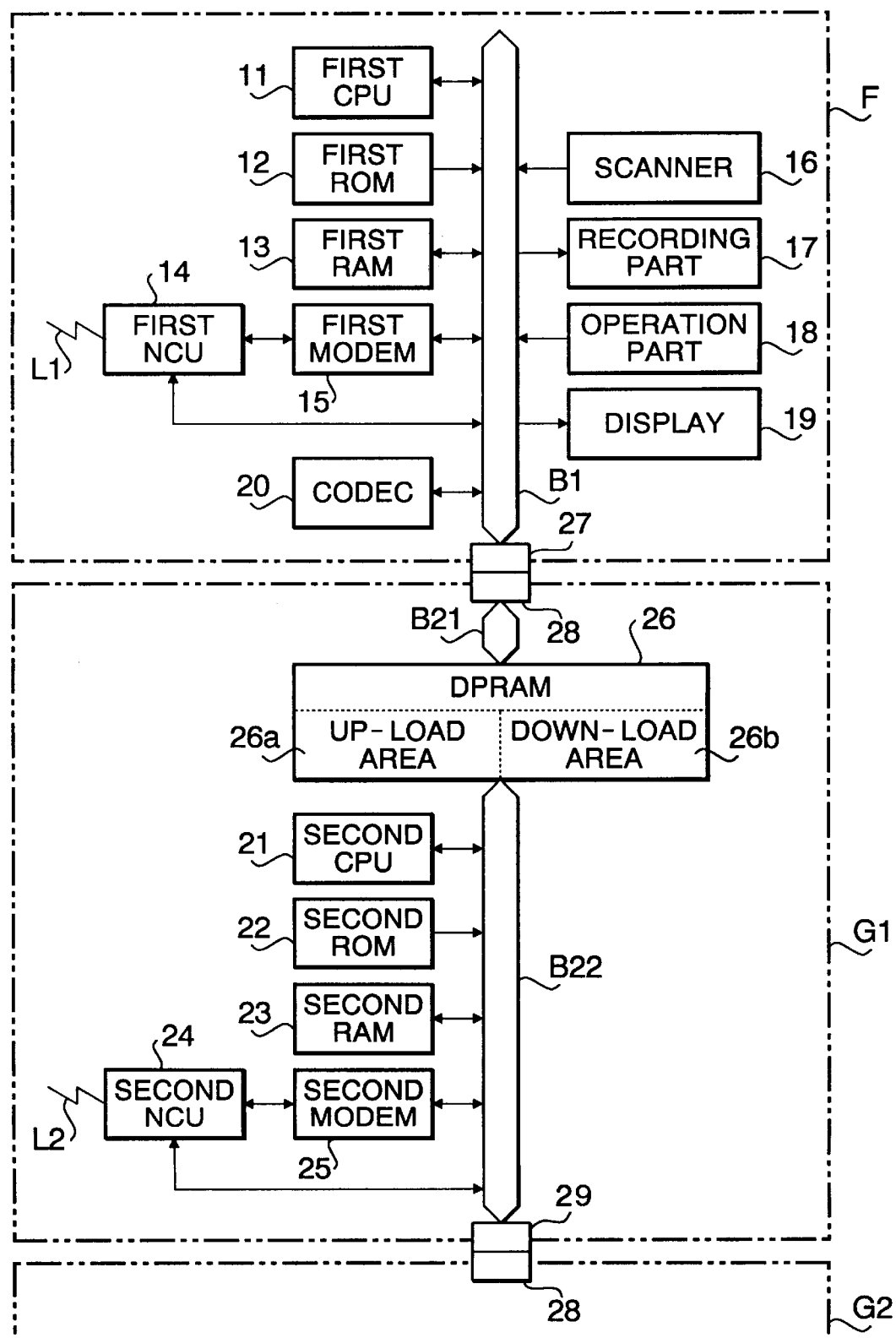
FIG. 1 is a block diagram of the facsimile device and external device according to one embodiment of the present invention.

As shown in FIG. 1, in the present embodiment, an external device G1 having a second telephone line L2 is connected to a facsimile device F having a first telephone line L1. Thus simultaneous communication over the first telephone line L1 of the facsimile device F and the second telephone line L2 of the external device G1 is possible. In short, in the present embodiment, a facsimile device having one telephone line may be expanded into a two telephone line facsimile device by connecting an external device G1 as an option.

Furthermore, another external device G2 may be connected to the external device G1 and yet another external device may be connected to this external device G2. In short, the present embodiment allows the sequential connection to a facsimile device F of a plurality of external devices G in a daisy chain format.

First, the facsimile device F having the first telephone line L1 will be described.

A first ROM (Read Only Memory) 12 that memorizes the programs and the like for control of the operations of the entire facsimile device F and transfer of data between the facsimile device F and the DPRAM 26 (described later) provided in the external device G1, and a first RAM (Random Access Memory) 13 that temporarily memorizes various types of information are connected to a first CPU (Central Processing Unit) 11 via a bus B1. In the present embodiment, the control means is constituted by the first CPU 11, first ROM 12 and first RAM 13.

A first NCU (Network Control Unit) 14 not only controls the connection with the first telephone lines L1 but is also provided with functions that transmit a dial pulse corresponding to a third parties telephone number and that detect a ringing signal.

A first modem 15 carries out modulation/demodulation of the transmission/reception data. Scanner 16 scans an image on a document. Recording part 17 carries out printing on recording paper of the received image data or the image data scanned by the scanner 16. Operation part 18 is provided with various types of operation keys such as dial keys for inputting a telephone number and a start key for starting the facsimile communication procedures.

A display 19 including an LCD or the like is for displaying various types of information. Codec 20 encodes the image scanned by the scanner 16 for transmission. Furthermore, codec 20 decodes the received image data. A first connector 27 is connected to the first CPU 11 via the bus B1 as a first connection means. This bus B1 has an address bus for transmission of an address signal, a data bus for transmission of data and a control bus for transmission of a signal that controls the first CPU 11 such as an interrupt signal or Busy signal and its structure allows full duplex communication.

Next, the external device G1 having the second telephone line L2 will be described. A second ROM 22 that memorizes the programs and the like for control of the operations of the entire external device G1 and the reading and writing operations of data into the DPRAM 26 (described later) provided in this external device G1, and a second RAM 23 that temporarily memorizes various types of information are connected to a second CPU 21 via a bus B22. In the present embodiment, the control means is constituted by the second CPU 21, second ROM 22 and second RAM 23.

A second NCU 24 not only controls the connection with the second telephone lines L2 but is also provided with functions that transmit a dial pulse corresponding to a third parties telephone number and that detect a ringing signal. A second modem 25 carries out modulation and demodulation of the transmission and reception data.

A DPRAM (Dual Port Random Access Memory) 26 is arranged in the external device G1 as a memory means capable of being read from and written into from both directions. This DPRAM 26 has two memory areas being an up-load area 26a and a down-load area 26b. DPRAM 26 is connected to the second CPU 21 via the bus B22. This bus B22 also has an address bus, data bus and control bus similar to the bus B1 of the facsimile device F and moreover, is also capable of full duplex communication.

A second connector 28 is connected to the DPRAM 26 via the bus B21 as a second connection means. This bus B21 also has an address bus, data bus and control bus similar to bus B1 and bus B22. The second connector 28 and the bus B21 connected to the connector 28 are capable of full duplex communication. Further, due to the connection between the first connector 27 of the facsimile device F and this second connector 28, full duplex communication between the facsimile device F and the external device G1 is possible and external device G1 is controlled by that facsimile device F as an supplementary device of the facsimile device F. Furthermore, the external device G1 is provided with a third connector 29 as a third connection means for connection to another external device G2. This third connector 29 connects to the second CPU 21 via a bus B22. This third connector 29 is also capable of full duplex communication.

It should be noted that the external device G2 is also provided with a second connector 28, third connector 29 and DPRAM 26 similar to the aforementioned external device G1. For example, if the external device G2 is a scanner, a scanner part for scanning an image may be arranged instead of the second NCU 24 and second modem 25 in the external device G1. Also, full duplex communication between both external devices G1,G2 is possible by the connection of the second connector 28 of this external device G2 with the third connector 29 of the external device G1. Thus thereafter, various types of external devices can be sequentially connected to the terminal external device.

The aforementioned up-load area 26a in the DPRAM 26 is the area for memorizing the data to be transferred from the external device to the facsimile device F and the aforementioned down-load area 26b in the DPRAM 26 is the area for memorizing the data to be transferred from the facsimile device F to the external device. Communication between the facsimile device F and the external device G1 is carried out via the DPRAM 26. Either the first CPU 11 of the facsimile device F or the second CPU 21 of the external device G1 operate by writing the information to be conveyed to the other in this DPRAM 26 and reading the information written by the other. In real terms, the facsimile device F reads the data in the up-load area 26a of the DPRAM 26 of the external device G1 and writes data into the down-load area 26b. The external device G1 reads the data in the down-load area 26a of the external device G1 and writes data into the up-load area 26b of the external device G1. As a result, communication is performed between the facsimile device F and the external device G1. It should be noted that the first external device G1 directly connected to the facsimile device F reads data from the up-load area 26a of the DPRAM 26 in the secondly connected external device G2 and writes data into the down-load area 26b of the same device G2.

Figure 2:
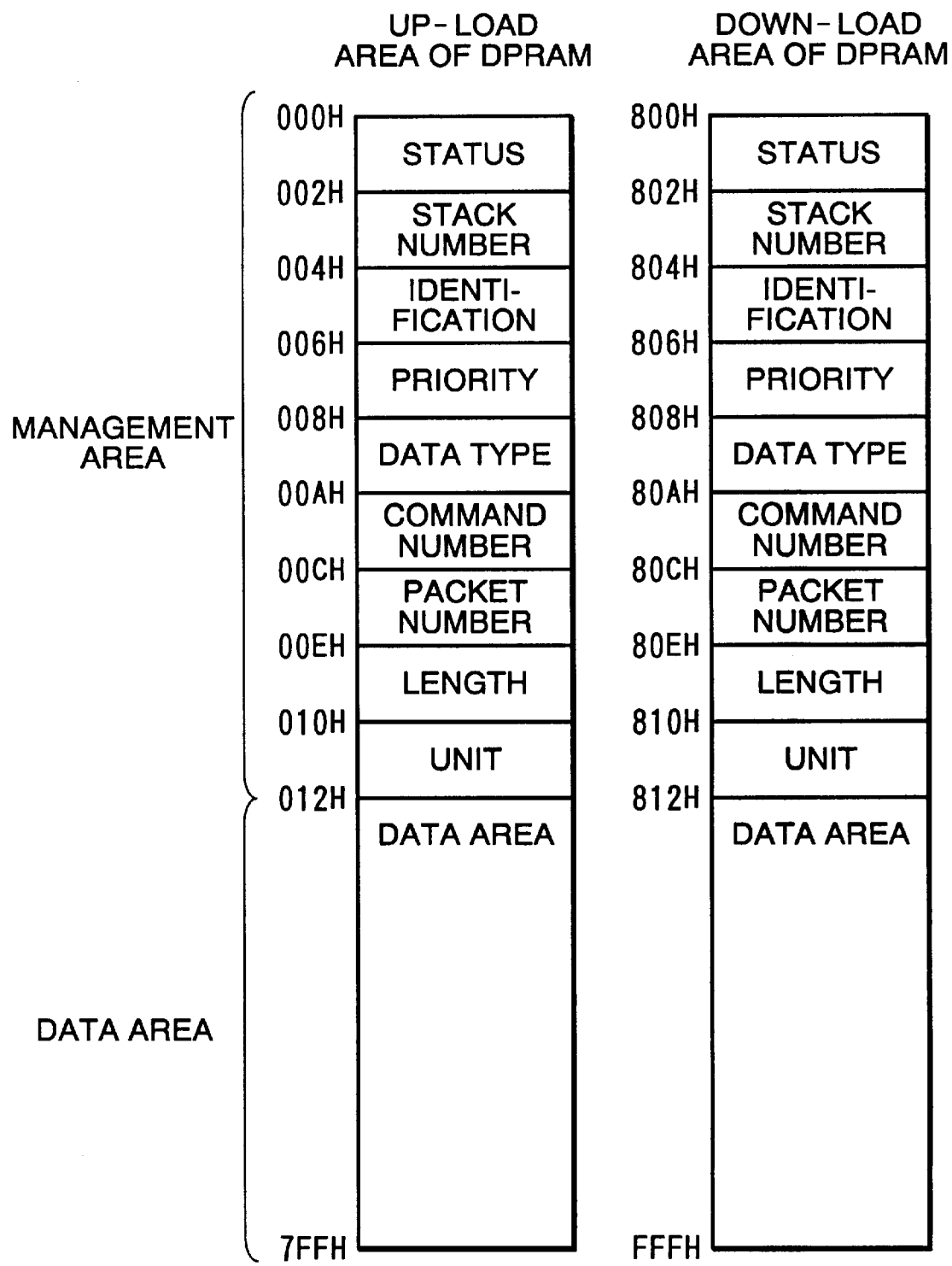
FIG. 2 is an explanatory diagram for describing the memory areas of the DPRAM.

As shown in FIG. 2, the internal part of the up-load area 26a and down-load area 26b in the DPRAM 26 are each arranged with management areas and data areas. The data area is an area for memorizing the actual data. The management area stores information relating to the actual data in the data area. This management area includes a status area, stack number area, identification area, priority area, data type area, command number area, packet number area, length area and unit area. Although not shown, it also includes an interrupt generation address for generating an interrupt signal and an interrupt stop address for stopping the interrupt signal.

The status area stores information showing the state of the data area and is used in the exclusive control between the aforementioned systems. The stack number area stores a stack number for determining whether or not the data in the data area is meant for itself. The identification area stores information for the identification of each external device type (for example, a modem or scanner or printer or the like). The priority area stores information showing which data should be first written into the up-load area 26a of the DPRAM 26 of the external device G1 when, for example, data to be sent to the facsimile device F is generated simultaneously by both external devices G1,G2. Data type area stores information showing the type of actual data. Command number area stores information showing the details of the command. Packet number area stores a packet number expressing each divided data when the data is to be split and then transmitted. In short, in the case where the memory capacity of the data area in each memory area 26a,26b of the DPRAM 26 is 1 kB (kilobyte), if the data volume to be transferred is 4 kB, it is necessary to divide it into 4 parts of 1 kB since 4 kB of data can not be transferred in one go. When this occurs, a packet number is attached to each division in order to show the order of the divided data. Length area stores information expressing the data length of the actual data. Unit area stores information expressing the unit of the data length. For example, if the information expressing the data length is "100" and the information expressing the unit is "Byte", the data in the data area is 100 bytes.

As shown in FIG. 3(a), a management table T for management of the information concerning the use of the down-load area 26b in the DPRAM 26 of the external device G1 is memorized in the first RAM 13 of the facsimile device F. Information expressing whether or not permission has been obtained to use the down-load area 26b in the DPRAM 26 is written into this management table T as a first semaphore management means. For example, when permission to use the down-load area 26b has not been obtained, a "1" is set in the "Down-load Area" row of the management table T and when permission has been obtained, a "0" is set.

Furthermore, information expressing whether or not permission has been obtained to use the particular data type to be written in the data type area of the down-load area 26b is written into this management table T as a second semaphore management means. It should be noted that those data types are such as a remote function, remote function return value, data transfer, data transfer result, AT command and AT command result code. For example, when "Data Transfer" is used as a data type to be written into the data type area, a "0" is set in the "Data Transfer" row of the management table T, allowing that use. Furthermore, when that permission to use is not granted, a "1" is set in the "Data Transfer" row of the management table T.

Furthermore, as shown in FIG. 3(b), a first management table T1 and second management table T2 are memorized in the second RAM 23 of the external device G1. First management table T1 manages the information relating to the use of the up-load area 26a in its (G1's) own DPRAM 26. Information expressing whether or not permission has been obtained to use the up-load area 26a in the DPRAM 26 is written into this first management table T1 as a first semaphore management means. Furthermore, information expressing whether or not permission has been obtained to use the particular data type to be written in the data type area of the aforementioned up-load area 26a is written into this first management table T1 as a second semaphore management means.

Second management table T2 manages the information relating to the use of the down-load area 26b in the DPRAM 26 of the external device G2. Information expressing whether or not permission has been obtained to use the down-load area 26b in the DPRAM 26 is written into this second management table T2 as a first semaphore management means. Furthermore, information expressing whether or not permission has been obtained to use the particular type to be written in the data type area of the down-load area 26b is written into this second management table T2 as a second semaphore management means.

Next, the actions of the present embodiment will be described.

As described above, in the present embodiment the facsimile device F can be sequentially connected to a plurality of external devices in a daisy chain format. In this kind of construction, when the facsimile device F reads the data in the up-load area 26a of the DPRAM 26 in the external device G1 directly connected the same device F, in short, when the facsimile device F reads the data transferred from the external device, it F needs to determine which external device is the transmission source of that data. Conversely, when the facsimile device F writes data into the down-load area 26b of the DPRAM 26 of the aforementioned external device G1, in short, when the facsimile device F transfers data to the external device, the facsimile device F needs to state in that data the external device to which that data is addressed. On the other hand, when each external device reads the data written into the down-load area 26b of its own DPRAM 26, in short when it reads the data transferred from the facsimile device F, the external device needs to determine whether that data is addressed to itself or not. Also, when each external device writes data into the up-load area 26a of its own DPRAM 26, in short when each external device transfers data to the facsimile device F, it needs to express in that data that itself is the transmission source of that data.

In order to satisfy the above requirements, the present embodiment performs the following operations. It should be understood that, as shown in FIG. 4, a plurality of external devices G1–Gn are now connected to the facsimile device F.

As shown in FIG. 4, in the case where an external device Gn (the n'th external device from the facsimile device F) transfers data to the facsimile device F, when data is written into the up-load area 26a of its (Gn's) own DPRAM 26, a "0" is written into the stack number area of the same area 26a as a stack number. Then, when the external device Gn–1 connected to the facsimile F side (up-load side) of the aforementioned external device Gn reads the data in the up-load area 26a of the external device Gn, it writes that read data into the up-load area 26a of its (Gn–1's) own DPRAM 26. At that time, the external device Gn–1 writes a "1" being a value incremented from the read stack number "0" by "1", into the stack number area of its own up-load area 26a.

Accordingly, while data transmitted from a certain external device Gn is transferred to the facsimile device F via a plurality of external devices, the stack number written in the stack number area of the up-load area 26a of each external device is incremented by "1" each time. Thus "n–1" is written in the stack number area of the up-load area 26a at the external device G1 connected directly to the facsimile device F as a stack number. Accordingly, when the facsimile F reads the data in the up-load area 26a of this external device G1, it recognizes based on the stack number "n−1" that the transmission source of the data is the external device Gn being the n'th connection from itself.

Conversely, in the case where, for example, the facsimile device F transfers data to the external device Gn which was the transmission source of the above data in the aforementioned case, when data is written into the down-load area 26b of the DPRAM 26 of the external device G1 which is connected first, "n−1" is written into the stack number area of that same area 26b as a stack number. When the first external device G1 reads the data in its own down-load area 26b, it determines that the data in the down-load area 26b is addressed to itself if the stack number in the stack number area is "0". However, since the stack number in the stack number area is "n−1" in this case, the external device G1 determines the data in the down-load area 26b to be data addressed to another external device. Then, the external device G1 writes the read data into the down-load area 26b of the DPRAM 26 of the external device G2 connected on the down-load side (on the opposite side to the facsimile device F). At this time, the external device G1 writes "n−2" (the value decremented by "1" from the previously read stack number "n−1") in the stack number area of the down-load area 26b of the external device G2.

Thus while data transmitted from the facsimile device F is transferred to the last (terminal) external device via a plurality of external devices, the stack number written in the stack number area of the down-load area 26b of each external device is decremented by "1" each time. Thus "0" is written as a stack number in the stack number area of the down-load area 26b of the n'th external device Gn−1. Accordingly, when the n'th external device Gn reads the data in its own down-load area 26b, it recognizes that the data in the down-load area 26b is data addressed to itself based on the stack number "0".

Due to the above described operations, the facsimile device F is able to easily and reliably recognize the external device which sent the data. Furthermore, each external device is able to reliably and easily recognize whether or not data sent from the facsimile device F is addressed to itself or not.

Figure 6:
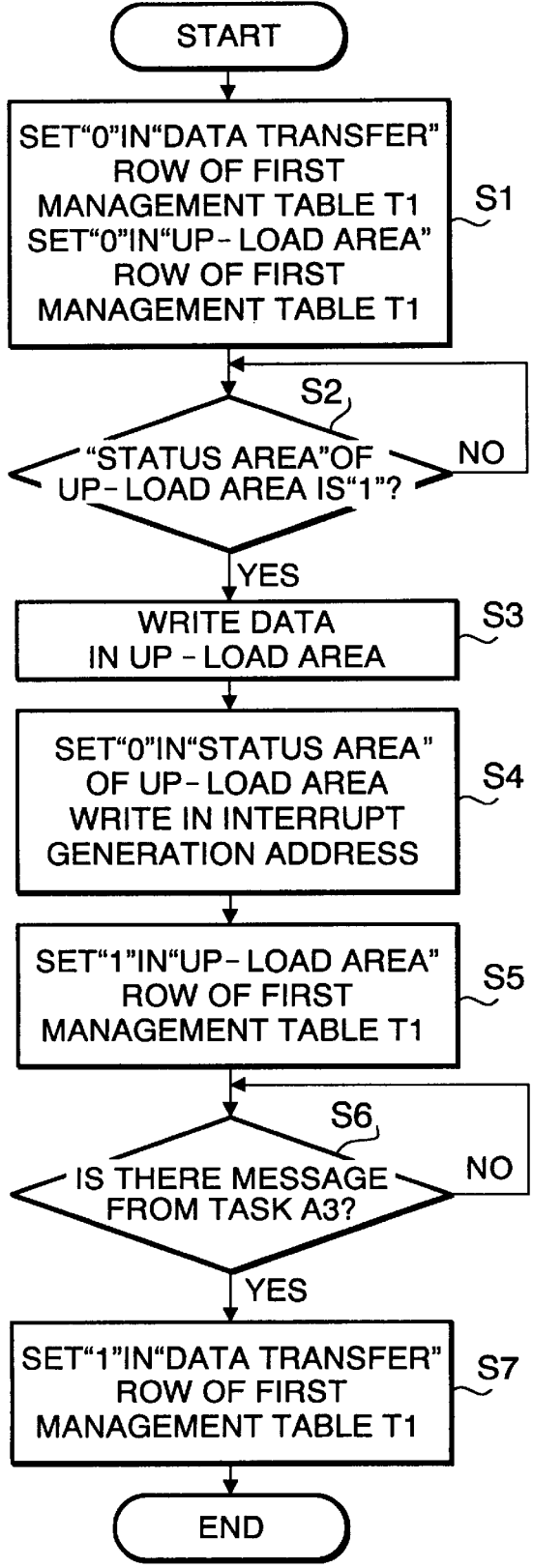
FIG. 6 is a flow chart showing the operations at the external device.
Figure 7:
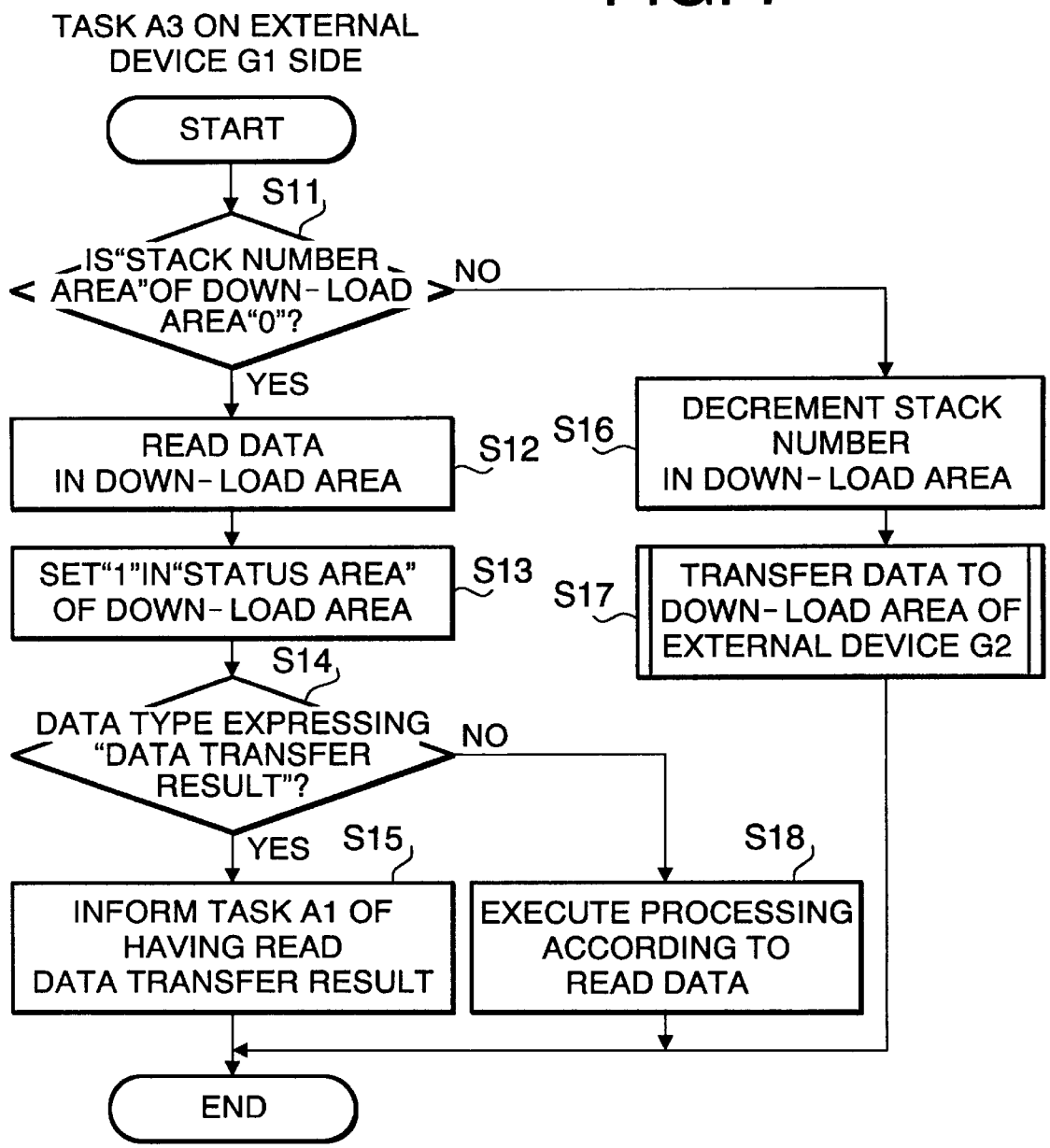
FIG. 7 is a flow chart showing further operations at the external device.
Figure 8:
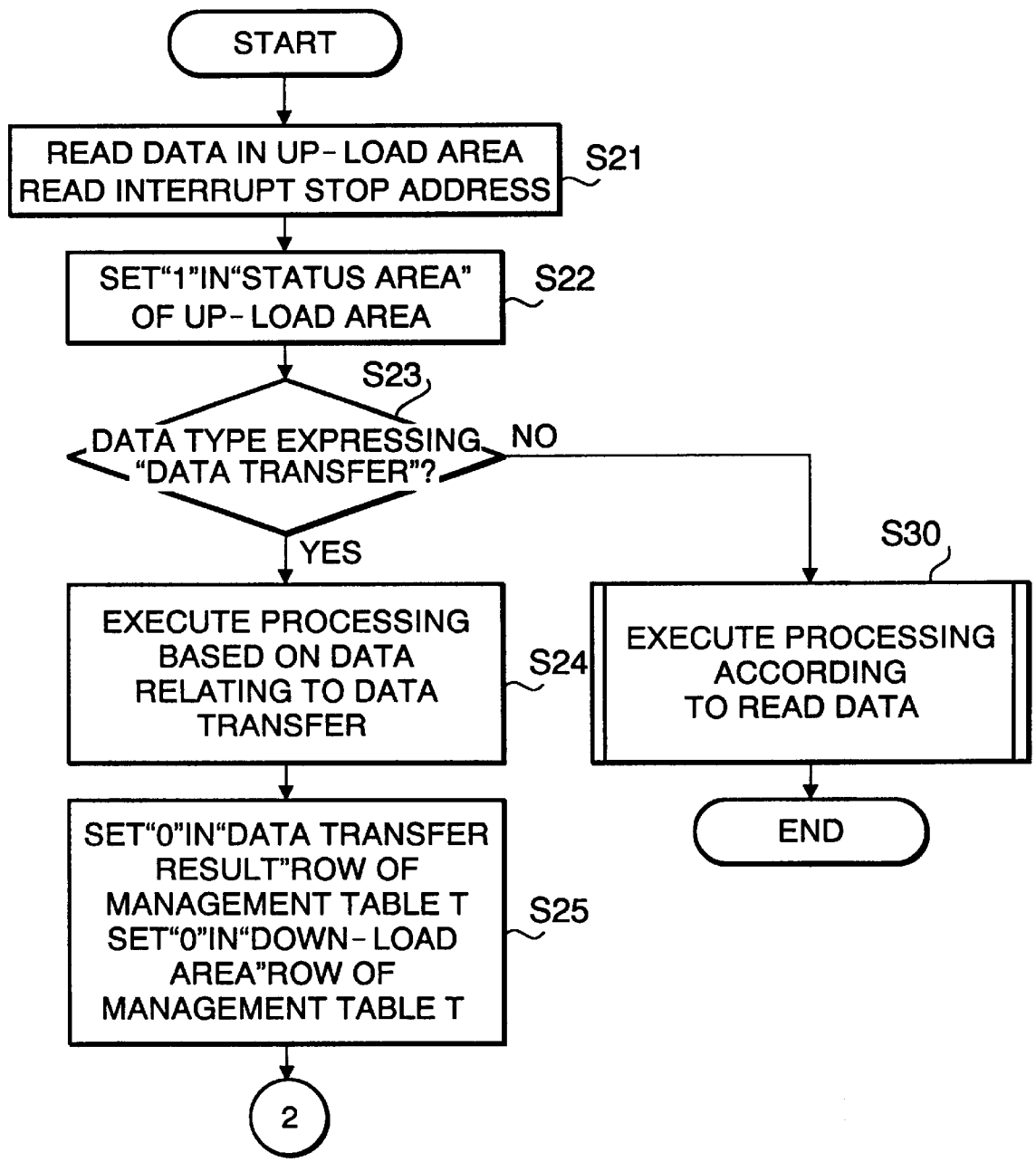
FIG. 8 is a flowchart showing the operations at the facsimile device.
Figure 9:
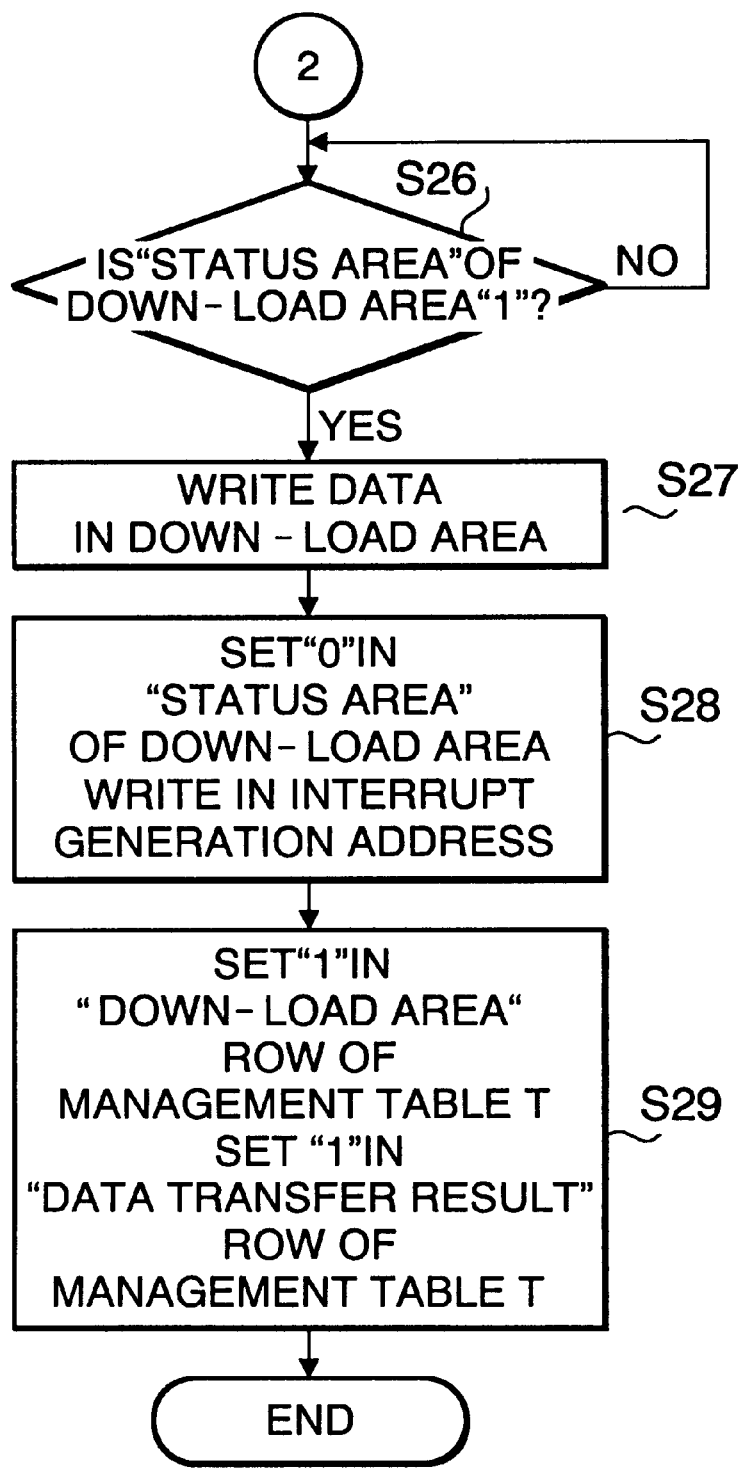
FIG. 9 is a flowchart showing further operations at the facsimile device.

Next, an example of the operations when a certain task A1 is generated in the external device G1 will be described using the flow charts of FIG. 5 and FIGS. 6–9. It should be noted that the flow charts of FIGS. 6 and 7 show the operation carried out at the external device G1 and the flow charts of FIGS. 8 and 9 show the operation carried out at the facsimile device F. The flow charts of FIGS. 6 and 7 and the flow charts of FIGS. 8 and 9 are executed in parallel.

Firstly, the operations of the task A1 in the external device G1 will be described using the flow chart of FIG. 6 and while referring to FIG. 5. This flow chart is carried out under control of the second CPU 21. It should be noted that data transfer to the facsimile device F is performed due to the generation of a task A1 at the external device G1.

When the task A1 is generated in the external device G1, task A1 demands permission (semaphore) to use a data type known as "Data Transfer" as shown in step 1 of FIG. 6. If this permission has already been obtained by another task, a real time monitor being an upper level management task makes task A1 temporarily stop processing until the semaphore is obtained (until the other task has discarded the semaphore). When the "Data Transfer" semaphore is obtained, the "Data Transfer" row of the first management table T1 of the second RAM 23 is switched from a "1" to a "0". After task A1 has obtained the "Data Transfer" semaphore, it requests permission (semaphore) to use the up-load area 26a. Similar to the "Data Transfer" semaphore, when a semaphore of the up-load area 26a is obtained, the "Up-load Area" row of the first management table T1 of the second RAM 23 is switched from a "1" to a "0".

At step S2, determination is performed whether the status area of the up-load area 26a is "1" or not, in short, whether the data in the up-load area 26a is necessary or not. When the status area is "1", it is determined that the reading of data by the facsimile device F is complete and the data in the down-load area 26a is unnecessary and operations proceed to step S3. When the status area is not "1", operations wait until the reading of the data by the facsimile device F are complete and the status area has become "1". Restated, a "1" in the status area indicates that the up-load area 26a of the DPRAM 26 may be used, in short, is in a released state.

At step S3, data is written into each area of the up-load area 26a and operations proceed to step S4. At this time, data indicating the "Data Transfer" is written in the data type area of the up-load area 26a. Furthermore, a "0" is written in the stack number area.

At step S4, the status area of the up-load area 26a is set with a "0" and thereafter, operations proceed to step S5. It should be stated that this "0" indicates that the data of the up-load area 26a is being exclusively used. Furthermore, simultaneous with this, an interrupt signal is output from the external device G1 to the first CPU 11 of the facsimile device F because of the interrupt generation address being written. In short, together with the writing into the interrupt generation address of the up-load area 26a, an interrupt signal is generated and input into the facsimile device F by a hardware circuit (not shown) arranged in the external device G1. Then, the first CPU 11 of the facsimile device F starts task A2 when the interrupt signal is input, and after confirming that the status area of the aforementioned up-load area 26a is "0", starts the reading of the data in the up-load area 26a.

At step S5, the "Up-load Area" row of the first management table T1 of the second RAM 23 is re-written from "0" to "1" and operations proceed to step S6. As a result, permission to use the up-load area 26a of the DPRAM 26 is released (the up-load area 26a is released to a usable state).

At step S6, determination is carried out whether there is a message from task A3 (described later). When there is a message, operations proceed to step S7. When there is no message, operations pause until a message arrives.

At step S7, the "Data Transfer" row of the first management table T1 of the second RAM 23 is re-written from "0" to "1" and task A1 is completed. In short, continuous with the release (abandonment) of permission to use the up-load area 26a, permission to use the data type known as "Data Transfer" has been released and then processing is completed.

Next, the operations of the task A2 at the facsimile device F will be described using the flow charts shown in FIG. 8 and 9 and while referring to FIG. 5. These flow charts show the execution carried out under the control of the first CPU 11 of the facsimile device F. It should be noted that this task A2 is started by the interrupt signal.

When an interrupt signal is input into the first CPU 11 of the facsimile device F, task A2 is started and the processing of the flowcharts of FIG. 8 and FIG. 9 begins. In short, after the interrupt signal has been stopped by reading the interrupt stop address, the status area of the up-load area 26a of the external device G1 is confirmed to be "0". Then, the data in the up-load area 26a of external device G1 is read out at step S21 shown in FIG. 8. When this reading out has finished, operations proceed to step S22.

At step S22, the status area of the up-load area 26a is set with a "1" and the up-load area 26a of the DPRAM 26 enters a usable state, in short, a released state and operations proceed to step S23.

At step S23, determination is carried out based on the read data of whether the data in the data type area is the data expressing the "Data Transfer". When it is the data expressing the "Data Transfer", operations proceed to step S24. When it is not the data expressing the "Data Transfer", operations proceed to step S30. It should be noted that, at this time, if the data in the stack number area is "0", it is determined based on the read data that the transmission source of the data in the up-load area 26a is the external device G1. If the data in the stack number area is something other than "0", it is determined that the transmission source of the data in the up-load area 26a is an external device other than external device G1. It should be noted that the following example presumes the data in the stack number area to be "0".

At step S24, the processing corresponding to those data contents are executed based on the previously read data and thereafter, operations proceed to step S25.

At step S25, as in S1, the "Data Transfer Result" row of the management table T of the first RAM 13 is rewritten from "1" to "0" and furthermore, the "Down-load Area" of the same management table T is rewritten from "1" to "0". As a result, permission to use the down-load area 26b of the DPRAM 26 is obtained and permission to use the type "Data Transfer Result" as a data type to be written in the data type area of the down-load area 26b is obtained. The operations then proceed to step S26 shown in FIG. 9.

At step S26, determination is carried out of whether the status area of the down-load area 26b is "1" or not. In short, determination is carried out of whether the data in the down-load area is unnecessary by the status area being "1". When the status area is "1", it is determined that the data in the down-load area 26b is unnecessary as the reading of the data by the external device G1 is complete and operations proceed to step S27. When the status area is not "1", the operations wait for the reading of the data by the external device G1 to be completed and for the status area to become "1".

At step S27, data is written into each area of the down-load area 26b and operations proceed to step S28. At this time, a "0" is written into the stack number area of the down-load area 26b and data expressing the "Data Transfer Result" is written into the data type area such that the external device G1 is informed of the processing result relating to the data from the external device G1.

At step S28, the status area of the down-load area 26b is set with a "0" and thereafter, operations proceed to step S29. It should be noted that this "0" shows that the data in the down-load area 26b is effective. Furthermore, simultaneous with this, an interrupt signal is output to the second CPU 21 of the external device G1 from the DPRAM 26 of the external device G1 by the writing of the interrupt generation address. In short, together with the status area of the down-load area 26b being set to "0" by the first CPU 11 of the facsimile device F, an interrupt signal is generated and input by a hardware circuit (not shown) arranged in the external device G1. Then the second CPU 21 of the external device G1 starts task A3 when the interrupt signal is input, and after confirming that the status area of the aforementioned down-load area 26b is "0" it 21 begins to read the data in the down-load area 26b.

At step S29, the "Down-load Area" row of the management table T of the first RAM 13 is re-written with a "1" from a "0", the "Data Transfer Result" row of the same table T is re-written with a "1" from a "0" and one series of operations are completed. In short, after the permission to use the down-load area 26b and the permission to use the data type called "Data Transfer Result" are released (abandoned), processing finishes.

At step S23 of FIG. 8, when the data type is not "Data Transfer", operations proceed to step S30, processing corresponding to the read data is executed and one series of operations is completed.

Next, the task A3 at the external device G1 will be described using the flowchart shown in FIG. 7 and while referring to FIG. 5. This flow chart shows the execution carried out under the control of the second CPU 21 of the external device G1.

When an interrupt signal is input in the second CPU 21 of the external device G1, task A3 starts and the processing of the flowchart shown in FIG. 7 begins. In short, after confirming that the status area of the down-load area 26b of the external device G1 is "0", determination is carried out whether the stack number area of the down-load area 26b is "0" or not as at step S11. When the stack number area is "0", the external device G1 determines that the data in the down-load area 26b is data addressed to itself and operations proceed to step S12.

At step S12, the data in the down-load area 26b is read out. When the reading out is complete, operations proceed to step S13.

At step S13, the status area of the down-load area 26b is set to "1" and enters the state where the down-load area 26b may be used (i.e. the released state) and operations proceed to step S14.

At step S14, determination is carried out based on the read data of whether the data in the data type area is the data showing "Data Transfer Result". When it is data showing the "Data Transfer Result", the data in the down-load area 26b is determined to be the processing result relating to the data transferred to the facsimile device F by the previous task A1 and operations proceed to step S15. When it is not data showing the "Data Transfer Result", the data in the down-load area 26b is determined to be data other than the processing result relating to the data transferred to the facsimile device F by the previous task A1 and operations proceed to step S18. More specifically, during the period after data is transferred to the facsimile device F until the data of the processing result relating to that transferred data returns from the facsimile device F, another task is sometimes generated at the facsimile device F. In this kind of situation, data of a data type other than "Data Transfer Result" is sometimes transferred first from the facsimile device F.

At step S15, the message that shows that the data transfer result has been read is notified to task A1 and this task A3 is completed. Then, at the task A1 which has been described, when the message from task A3 is received at step S6, it is determined that the processing result relating to the data transferred to the facsimile device F has been returned from the facsimile device F and after processing of S7, one series of processing is completed.

Conversely, at step S11, when the stack number area is not "0", it is determined that the data in the down-load area 26b is data addressed to another external device and operations proceed to step S16.

At step S16, the stack number in the stack number area of the down-load area 26b is decremented by "1" and operations proceed to step S17.

At step S17, the data of the down-load area 26b of the external device G1 is transferred into the down-load area 26b of the second external device G2. At this time, a stack number decremented at step S16 is written in the stack number area of the down-load area 26b of the external device G2 and this task A3 is completed.

Furthermore, at step S14, when the data type is not "Data Transfer Result", processing corresponding to the data read at step S18 is executed and this task A3 is completed.

Figure 5:
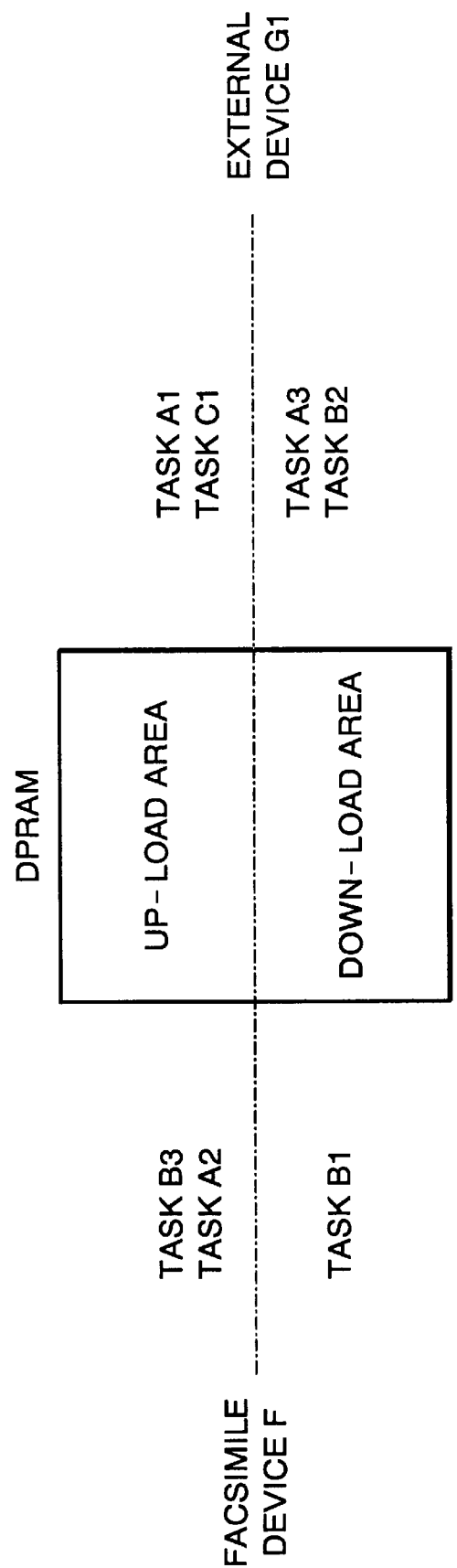
FIG. 5 is an explanatory diagram for describing the data transfer operations between the facsimile device and the external device.

Herein, as shown in FIG. 5, it is presumed that, simultaneous with writing of data into the up-load area 26a at the external device G1 side at step 3 in association with the generation of for example, task A1 "Data Transfer", the writing of data in the down-load area 26b of external device G1 is also performed in association with the generation of a task B1 "Data Transfer" at the facsimile device F side. In this case, at the external device G1, after the writing of data into the up-load area 26a is finished, the "Up-load Area" row of the first management table T1 returns to "1" and the permission to use the up-load area 26a is released. Conversely, at the facsimile device F, the "Down-load Area" row of the management table T returns to "1" and the permission to use the down-load area 26b is released after the writing of data into the down-load area 26b is finished.

Furthermore, at the facsimile device F, after the processing corresponding to the data in the up-load area 26a is performed according to the task A2, it is necessary to write data expressing that processing result in the down-load area 26b such that the processing result be reported to the external device G1. Conversely, at the external device G1, after the processing corresponding to the data in the down-load area 26b is performed according to the task B2, it is necessary to write data expressing that processing result in the up-load area 26a such that the processing result be reported to the facsimile device F.

In this kind of case, the facsimile device F changes the "1" in the "Data Transfer Result" row of the management table T to a "0" in order to obtain permission to use a data type called "Data Transfer Result". Furthermore, the facsimile device F changes the "1" in the "Down-load Area" row of the management table T to a "0" in order to re-obtain permission to use the down-load area 26b previously released. In this state, the facsimile device F is able to write data expressing the processing result into the down-load area 26b. Accordingly, the external device G1 is able to confirm the processing result of the down-load area 26b by the task A3.

On the other hand, the external device G1 changes the "1" in the "Data Transfer Result" row of the first management table T1 to a "0" in order to obtain permission to use a data type called "Data Transfer Result". Furthermore, the external device G1 changes the "1" in the "Up-load Area" row of the first management table T1 to a "0" in order to re-obtain permission to use the up-load area 26a previously released. In this state, the external device G1 is able to write data expressing the processing result into the up-load area 26a. Accordingly, the facsimile device F is able to confirm the processing result of the up-load area 26b by the task B3.

Due to the execution of the above described operations, both the facsimile device F and external device G1 are able to confirm without hindrance the processing result from the other even if there is a request for processing to the other at the same time and thus the operations proceed smoothly to the next step.

In short, in the present embodiment, the permission to use (semaphore) each area 26a, 26b of the DPRAM 26 and the permission to use the data type are independently managed. Moreover, concerning the data type, it is possible to the set the permission to use (semaphore) for each of the those types. Due to this, after the facsimile device F and external device G1 respectively write data into each area 26a, 26b, if the permission to use each area 26a, 26a has been released, the areas 26a, 26b may once again be obtained in order to write data of the processing result. Furthermore, as the type of data expressing the processing result is a type known as "Data Transfer Result" differing from the type known as "Data Transfer", the permission to use the data type known as "Data Transfer Result" may be obtained separately from the permission to use "Data Transfer". As a result, the facsimile device F and external device G1 are able to write data of the processing result with respect to a request from the other in each area 26a, 26b of the DPRAM 26 even if there is a request for processing to the other at the same time and thus there is no situation where writing of the processing result data can not be performed.

Furthermore, at the external device G1, after the data is written in the up-load area 26a as shown in step S3 in association with the generation of the aforementioned task A1, supposing a task C1 separate from the that task A1 is generated. In this case, if the data type of task C1 is "Function Operated by Remote Control" for example, as it differs from the "Data Transfer" being the data type of task B1, the external device G1 changes the "1" of the "Function Operated by Remote Control" row of the first management table T1 to a "0" and is able to obtain permission to use the data type known as "Function Operated by Remote Control". Thereafter, at the external device G1, after the data is written in the up-load area 26a according to task A1, the permission to use the up-load area 26a is released due to the "Up-load Area" row of the first management table T1 being returned to a "1". If this kind of state occurs, the external device G1 is able to obtain permission to use the up-load area 26a by re-changing the "Up-load Area" row of the first management table T1 to "0" by task C1. Accordingly, the external device G1 is able to transfer data relating to the "Function Operated by Remote Control" to the facsimile device F by writing it in the up-load area 26a without waiting for the processing result relating to the "Data Transfer" from the facsimile device F.

Furthermore, in the present embodiment, when the facsimile device F requests a processing to the external device G1, the following operations are performed. It should be noted that these operations will be described with reference to FIG. 4. In this case, the first external device G1 is a modem unit as shown in FIG. 1, the second external device G2 is a scanner, the n−1'th external device Gn−1 is a printer and the n'th external device Gn is a modem unit similar to the external device G1.

When the facsimile device F wants to request a transmission processing to an external device, data expressing that is written in the down load area 26b of the first external device G1. At this time, data (in this case, data expressing a modem unit) showing the type of external device corresponding to the request details is stored in the identification area of the down-load area 26b. Furthermore, a special value showing that all of the external devices are the intended address of the data is stored in the stack number area of the down-load area 26b. When external device G1 reads the data in the down-load area 26b, as the data in the stack number area is the above described special value and moreover as the data of the identification area is data expressing a modem unit, it determines that the request from the facsimile device F is intended for itself. At this time, if the external device G1 is in the middle if another communication, it can not receive a request from the facsimile device F thus the read data is written into the down-load area 26b of the second external device G2 only when the value of the stack number area is the special value where the destination is all the external devices.

When the second external device G2 reads the data in the down-load area 26b, as the data of the identification area is data expressing a modem unit, it determines that the request from the facsimile device F is not intended for itself. Accordingly, the external device G2 writes the read data into the down-load area 26b of the third external device G3 (not shown).

In this way, when no external device being a modem unit exists between external device G2 and external device Gn−1, the data from the facsimile device F is transferred to the down-load area 26b of external device Gn. When the n'th external device Gn reads the data in the down-load area 26b, as the data in the stack number area is the above described special value and moreover as the data of the identification area is data expressing a modem unit, it determines that the request from the facsimile device F is intended for itself. At this time, if the external device Gn is in the middle if another communication and it can not receive a request from the facsimile device F, it writes a reply stating this in the up-load area 26a. Conversely, if the external device Gn is not in the middle of another communication and it can receive the request from the facsimile device F, it writes a reply stating this in the up-load area 26a. At this time, a "0" is written in the stack number area of the up-load area 26a.

Then, the data in the up-load area 26a of this external device Gn is transfer to the up-load area 26a of the first external device G1 via a plurality of external devices. It should be noted that the stack number is sequentially incremented in association with this transfer. Facsimile device F determines whether the request for transferred processing has been accepted by an external device based on the data in the up-load area 26a of external device G1. When accepted, it recognizes based on the read stack number which number external device was the external device that accepted that request. Then the facsimile device F writes for example the image data to be transmitted into the down-load area 26b of the first external device G1. At this time, an "n−1" is written into the stack number area of the down-load area 26b. Accordingly, the data in the down-load area 26b is sequentially transferred as far as the down-load area 26b of the terminal external device Gn and determination that the data is addressed to itself is performed at that external device Gn. The external devised Gn then transmits the received data.

It should be noted that the present embodiment may be realized under the following changes, with functions and advantages similar to the present embodiment.

(a) A printer or scanner or any such device may be prepared as an external device to be connected to the facsimile device F. For example, if the external device is a printer, a recording part may be arranged in place of the second NCU 24 and second modem 25 in the external device G1 shown in FIG. 1. If this kind of external device is connected, the image data received by the facsimile device F may be transferred to this external device and printed out. Furthermore, if an external device is a scanner, a scanning part may be arranged in place of the second NCU 24 and second modem 25 in the external device G1 shown in FIG. 1. If this kind of external device is connected, the image data scanned by the same external device may be transferred to the facsimile device F and transmitted from that device F.

Figure 10:
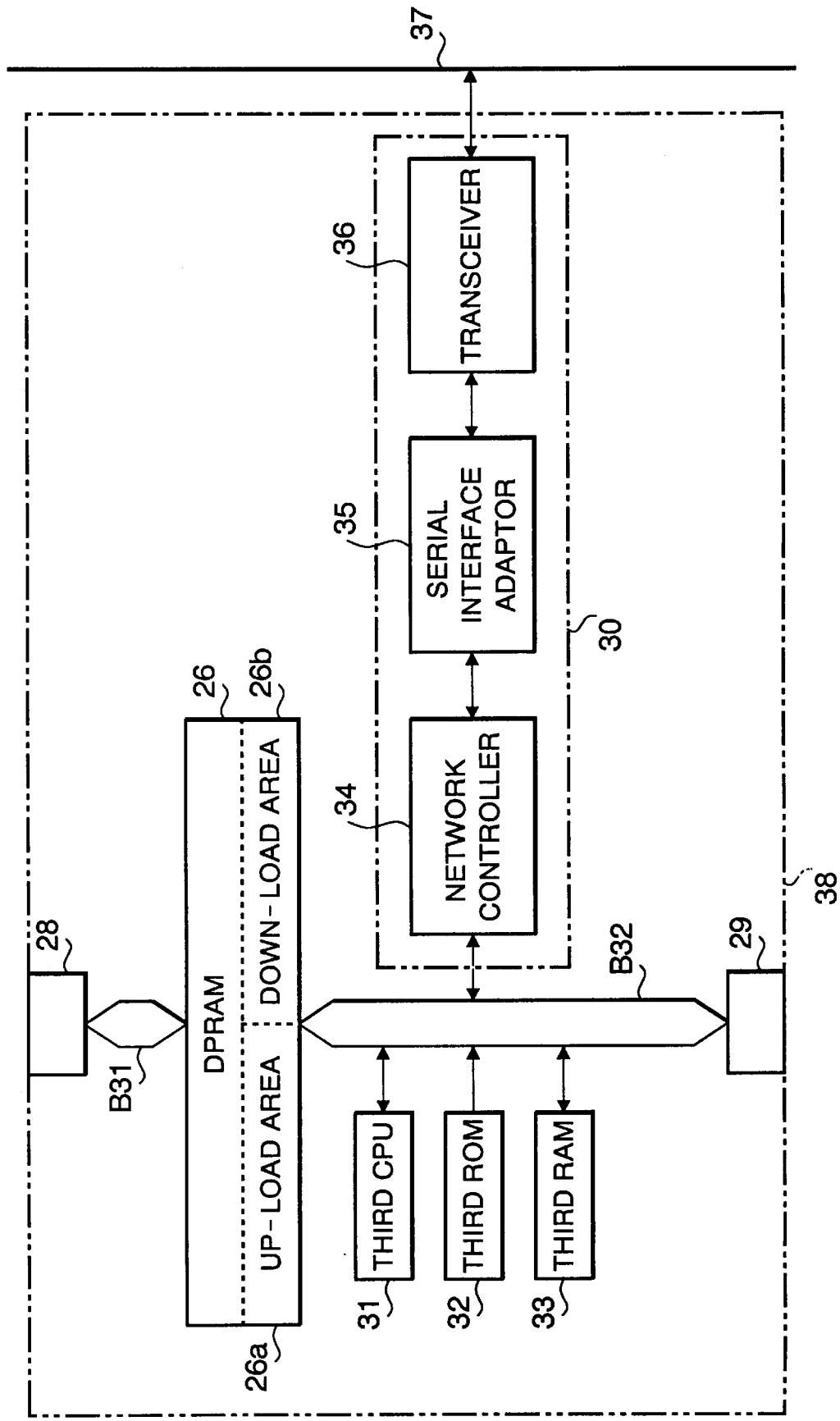
FIG. 10 is a block diagram showing the external device for connection to a LAN.

Furthermore, a device as shown in FIG. 10 may be prepared as an external device. This external device 38 of FIG. 10 connects the facsimile device F to a LAN (Local Area Network) or the like and allows the use as one terminal on a LAN.

As shown in FIG. 10, a network interface 30 is arranged in this external device 38 in place of the second NCU 24 and second modem 25 in the external device G1 shown in FIG. 1. In short, this external device 38 is provided with buses B31, B32, DPRAM 26, second connector 28, third connector 29, third CPU 31, third ROM 32, third RAM 33 and a network interface 30. A bus type LAN such as an ethernet or the like may be used as a LAN and the facsimile device F is connected to a coaxial cable 37 such as 10 Base 2 via the external device 38.

Similar to the external device G1 of FIG. 1, the DPRAM 26 has an up-load area 26a and a down-load area 26b and the third RAM 33 has a first management table T1 and a second management table T2.

The network interface 30 is provided with a network controller 34, serial interface adaptor 35 and transceiver 36. Network controller 34 is provided with functions that carry out access control with the LAN in accordance with CSMA/CD (Carrier Sense Multiple Access with Collision Detection) formats or the like in order to suitably transmit the data from the facsimile device F along a coaxial cable 37. Serial interface adaptor 35 converts the data transmitted along the coaxial cable 37 from the facsimile device F to serial data from parallel data and outputs the serial data that the coaxial cable 37 conveys to the facsimile device F after converting it to parallel data. Transceiver 36 is arranged for connection with the coaxial cable 37 and converts the signal level in order to align the signal level in the coaxial cable 37 and the signal level in the serial interface adaptor 35.

Accordingly, if this external device 38 is connected to a facsimile device F or an external device connected to the facsimile device F, the facsimile device F may be used as one terminal on a LAN. As a result, the facsimile data received by the facsimile device F via the first telephone lines L1 may be transferred to a terminal on the LAN such as a personal computer or the like, and the data from a terminal on the LAN such as a personal computer may be transmitted via the first telephone lines L1 from the facsimile device F.

(b) On the aforementioned present embodiment, the stack number is incremented and decremented by "1" at a time but this may be incremented and decremented by two or more. Furthermore, when an external device starts the transfer of data from itself to the facsimile device F, the stack number normally starts at "0" but this starting value may be set at a value other than "0". Corresponding to this, the external device sets the value of the stack number that determines that the data is addressed to itself, to a value other than "0".

(c) A change may be carried out such that the stack number is incremented when data is transferred from the facsimile device F to the external device and the stack number is decremented when data is transferred from the external device to the facsimile device F.

(d) The DPRAM 26 may be changed to a first FIFO (First In First Out) memory that transfers the data from the first CPU 11 to the second CPU 21, and to a second FIFO memory that transfers data from the second CPU 21 to the first CPU 11.

(e) The external device does not have to be external but may be arranged inside the facsimile device.

(f) The information processing device is not limited to a facsimile device F but may be applied to any device such as a personal computer or the like.

What is claimed is:

1. An information processing system comprising:

a first external device provided with a first memory means for reading and writing from both directions; and an information processing device having a first connection means for connecting with the first external device and a first control means for controlling the external device by carrying out data transfer between the information processing device and the first memory means via the first connection means, wherein the first memory means is provided with an up-load area for memorizing the data to be transferred to the information processing device side from the first external device side and a down-load area separate from said up-load area for memorizing the data to be transferred to the first external device side from the information processing device side, wherein the first external device is provided with a second connection means for connection to the information processing device, a second control means for controlling the data transfer between the first memory means and the information processing device via the second connection means, a third connection means for connection to a second external device, and third control means for controlling the data transfer between the first memory means and the second external device via the third connection means, wherein the second external device is provided with a second memory means for reading and writing from both directions, and which is connectable to a third external device.

2. The information processing system as in claim 1, further comprising:

fourth connection means for connection to the third external device; and fourth control means for controlling the data transfer between the second memory means and the third external device via the fourth connection means.

* * * * *